United States Patent [19]
Yasui et al.

[11] Patent Number: 5,723,225
[45] Date of Patent: Mar. 3, 1998

[54] SUPERPLASTICALLY FORMED, DIFFUSION BONDED MULTIPLE SHEET PANELS WITH WEB DOUBLERS AND METHOD OF MANUFACTURE

[75] Inventors: Ken K. Yasui, Huntington Beach; David F. Bertino, Hermosa Beach; Krishna Hoffman, Duarte; David H. Hamilton, Long Beach, all of Calif.

[73] Assignee: McDonnell Douglas Corporation, Huntington Beach, Calif.

[21] Appl. No.: 703,259

[22] Filed: Aug. 26, 1996

[51] Int. Cl.⁶ .................................................. B32B 15/00
[52] U.S. Cl. ........................... 428/593; 428/594; 428/120; 228/157
[58] Field of Search ............................ 428/120, 593, 428/594; 228/157

[56] References Cited

U.S. PATENT DOCUMENTS

| | | | |
|---|---|---|---|
| 3,927,817 | 12/1975 | Hamilton et al. | 228/157 |
| 4,217,397 | 8/1980 | Hayase et al. | 428/594 |
| 4,292,375 | 9/1981 | Ko | 428/593 |
| 4,304,821 | 12/1981 | Hayase et al. | 428/593 |
| 4,318,965 | 3/1982 | Blair | 428/593 |
| 4,351,470 | 9/1982 | Mansbridge | 228/157 |
| 4,530,197 | 7/1985 | Rainville | 52/797 |
| 5,055,143 | 10/1991 | Runyan et al. | 148/11 R |
| 5,069,383 | 12/1991 | Cooper | 228/157 |
| 5,129,248 | 7/1992 | Yasui | 72/60 |
| 5,129,787 | 7/1992 | Violette et al. | 416/226 |
| 5,289,965 | 3/1994 | Yasui et al. | 228/157 |
| 5,323,953 | 6/1994 | Adderley et al. | 228/157 |
| 5,330,092 | 7/1994 | Gregg et al. | 228/157 |
| 5,330,093 | 7/1994 | Bottomley et al. | 228/157 |
| 5,413,271 | 5/1995 | Mansbridge et al. | 228/157 |
| 5,420,400 | 5/1995 | Matsen | 219/615 |
| 5,451,472 | 9/1995 | Gregg et al. | 428/593 |
| 5,603,449 | 2/1997 | Mansbridge et al. | 228/157 |

*Primary Examiner*—Alexander Thomas
*Attorney, Agent, or Firm*—Bell Seltzer Intellectual Property Group of Alston & Bird LLP

[57] ABSTRACT

Four sheet SPF/DB panels having thick perpendicular webs formed between face sheets for areas of high compressive stress while other areas have relatively thinner webs so that the overall weight of the panel is not excessive. The thick webs are constructed by welding doubler strips or grids to core sheets when the core sheets are welded together into a core assembly prior to panel formation. When the core assembly so formed is superplastically deformed, the outer edges of the doubler strips bond to the face sheet and then are stretched into the centers of the thick webs, thereby thickening them for additional compressive strength. Normally such are used to reinforce edge joints between panels or supporting structure.

8 Claims, 5 Drawing Sheets

5,723,225

SUPERPLASTICALLY FORMED, DIFFUSION BONDED MULTIPLE SHEET PANELS WITH WEB DOUBLERS AND METHOD OF MANUFACTURE

BACKGROUND OF THE INVENTION

Superplasticity is the characteristic demonstrated by certain metals to develop unusually high tensile elongation with minimum necking when deformed within a limited temperature and strain-rate range. This characteristic, peculiar to certain metal and metal alloys, has been known in the art as applied to production of complex shapes. It is further known that at the same superplastic-forming temperatures, the same materials can be diffusion-bonded by forcing contacting surfaces together. Many prior art processes and structures use diffusion bonding and superplastic forming, such as shown in: Hamilton et al., U.S. Pat. No. 3,927,817; Ko, U.S. Pat No. 4,292,375; Rainville, U.S. Pat. No. 4,530,197, and Bottomley et al. U.S. Pat. No. 5,330,093 which must include a maskant or "stop off" material to prevent unwanted bonding, and Blair, U.S. Pat. No. 4,318,965; Violette et al., U.S. Pat. No. 5,129,787; Gregg et al., U.S. Pat. No. 5,330,092; Matsen, U.S. Pat. No. 5,420,400; and Gregg et al., U.S. Pat. No. 5,451,472, which disclose superplastically formed diagonally reinforced structures and the processes to construct the same.

As shown in Hayase, et al., U.S. Pat. No. 4,217,397, four sheets of superplastically formable material, such as titanium alloy can be used to provide a metallic sandwich structure. Generally, two or three contiguous work sheets are joined together by a distinct continuous seam weld in a pre-selected pattern, which determines the geometry of the structure of the core to be produced. An expandable envelope is formed by sealing the perimeter of the joined sheets. The joined and unjoined work sheets are then placed in a stacked spaced relationship and contained in a limiting fixture or die. The space between the upper and lower limiting fixture members determines the height and shape of the sandwich structure that ultimately results. At least one of the work sheets is then superplastically formed against the other work sheet, to which it becomes diffusion-bonded to form the desired sandwich structure.

A particularly advantageous structure that can be formed is a four-sheet structure that ultimately results in two generally parallel face-sheets with perpendicular webs extending there between. The webs are formed by two sheets, which are intermittently welded together along a seam there between. When pressurized during a superplastic forming operation, the spaces between the two welded sheets expand into balloon-like structures until they contact the face sheets and can expand outwardly no more. The face sheets, are held in a proper final position inside a hot press. Application of continuing pressure causes the balloon-like structures to assume square shapes with the seams being positioned halfway between the face sheets on the perpendicular webs. The sheets adjacent the web ultimately are formed 90° into contact with each other, and diffusion-bonded together into a single structure. Heretofore, the webs of such four-sheet superplastically formed, diffusion-bonded (SPF/DB) structures tend to thin at their ends because of the way the material must flow to form them. This is particularly disadvantageous in areas where damage tolerance capabilities are needed or in areas where mechanical fastened joints are required because the standard four sheet SPF/DB sandwich structure lacks sufficient clamp-up strength to assure uniform bearing-stress distribution and overall joint efficiency.

Therefore, there has been a need to improve the basic four-sheet SPF/DB process so that SPF/DB processes can be used to fabricate panels with structurally enhanced webs without appreciable weight gain, where the improvements can be combined with other improvements to broaden the applications where SPF/DB structures can be considered.

BRIEF DESCRIPTION OF THE INVENTION

In the present process, doubler strips or grids are positioned at the outside of the core sheets in the pattern of the webs to be formed. The doubler strips are then welded to the outer core sheets when the outer core sheets are welded together. If diagonal reinforcement is desired, two relatively thin sheets are added to the center of the core of the four-sheet SPF/DB assembly, so that six sheets with the doubler strips on the outside result. The two additional sheets have small gas transmission holes formed therein at strategic locations so that a pressure differential never develops across the additional sheets.

If only longitudinal webs are to be formed, then linear doubler strips are used, whereas if multi-dimensional webs are desired, doubler grids are formed in the pattern of the webs and the welds are formed with automated machinery to follow the pattern. In this way, many different web patterns can be created to form triangular, square, and hexagonal cells for example. Once the core assembly is formed, face sheets are added to the stack and the edges are sealed with a first pressure line connected to the area between the core and the face sheets and a second pressure line connected into the core. This assembly is then placed in a die in a hot press, the assembly is heated to about 1650° F. and a controlled flow of inert gas is introduced between the core and the face sheets to superplastically form the face sheets to the shape of the die. The flow may be gas-mass controlled as discussed in Yasui, U.S. Pat. No. 5,129,248 or just maintained in a pressure range since face sheet forming is rarely critical. The inert gas causes the face sheets to gradually assume the shape of the die in which the assembly has been placed. A slightly higher pressure is applied to the second pressure line at the same time, so that a slight differential pressure appears between the outer sheets and the inner core to prevent the core sheets from diffusion bonding together during face sheet formation.

When the face sheets have been formed, controlled gas-mass flow is introduced into the core, while sufficient pressure is maintained between the core and the face sheets to keep the face sheets in proper position against the die. As the gas flows, the core sheets and the doubler strips balloon outwardly between the welds. Since the volume between the face sheets and the core gradually reduces, inert gas is bled out of the first tube to maintain face sheet securing pressure. The welds between the core sheets and the strips and the additional thickness of the core sheets and the strips cause those areas to remain relatively flat. As a result, the areas of the core sheets between the doubler strips contact the face sheets first so that most of the material of the doubler strips ends up in the vertical webs created when the balloons expand to touch each other. While controlled gas-mass flow is being used, the pressure being applied is monitored. The pressure characteristically rises toward the end of the core forming process to indicate that no more expansion of the core sheets is occurring, at which time the pressure at the first tube can be relieved.

When the process is complete, an SPF/DB panel results which has thicker perpendicular webs between the face sheets where the strips were located and a thicker reinforcement area adjacent the ends of the webs. If, lateral and longitudinal webs are desired so that the resultant panel has similar sheer strength in orthogonal directions and enhanced compressive strength, then a cross-hatch pattern of interrupted welds are formed on a doubler grid. The interrupted welds allow forming gas to flow and equalize throughout the core. Thereafter, the structure is heated and blown as before, resulting in evenly spaced orthogonal webs that are thicker and stronger where the doubler grid was located.

Therefore, it is an object of the present invention to improve upon standard SPF/DB four sheet processes, especially when it is desired to have edge portions that can withstand compressive stresses caused by butt joint structures.

Another object is to improve the compressive strength of perpendicular webs in a four-sheet SPF/DB panel in locations where such compressive strength is needed, without needlessly increasing the weight of the panel.

Another object is to provide a method to prevent excessive thinning of webs in an SPF/DB panel.

These and other objects and advantages of the present invention will become apparent to those skilled in the art after considering the following detailed specification, together with the accompanying drawings wherein:

DETAILED DESCRIPTION OF THE SHOWN EMBODIMENTS

Figure 1:
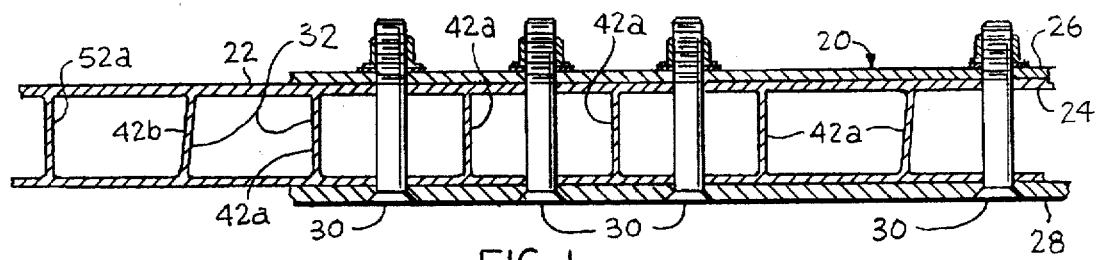
FIG. 1 is a cross-sectional view of a bolted joint between the edges of two prior art SPF/DB four-sheet panels.

Referring to the drawings more particularly by reference numbers, number 20 in FIG. 1 refers to a joint between two prior art four sheet superplastically formed, diffusion bonded (SPF/DB) panels 22 and 24 held edge to edge by doubler plates 26 and 28 and suitable fasteners 30. The prior art four sheet SPF/DB process produces relatively thin webs 32 unless the starting sheets are excessively thick. The starting sheet thickness for the thin webs 32 is chosen based on the strength requirements of the panels 22 and 24. If they are thick enough to withstand the compressive loads generated by the fasteners 30 at the joint 20, the panels 22 and 24 become too heavy to be efficient panel structures for supersonic aerospace vehicles, where they are planned for use.

The material of the sheets used to superplastically form the panels 22 and 24 must exhibit the characteristic of unusually high tensile elongation with minimum necking when deformed within a limited temperature and strain rate range. Several kinds of materials demonstrate these superplastic properties. Titanium alloys are the preferred sheet material although some alloys of aluminum are also superplastically formable. The superplastic temperature range varies with the specific alloy used. However, the temperature just below the phase transformation temperature is near optimum. This temperature for most modern titanium alloys is about 1650° F. The best strain rate is usually determined experimentally for each alloy and controlled by using the controlled gas-mass flow method discussed above. If the strain rate is too rapid the sheet material being deformed will blow out and if the rate is too slow the material looses some of its plasticity, and the process costs are increased by excessive labor and energy usage, and the reduced production availability of expensive hot press resources. The sheets must be suitable for diffusion bonding. Diffusion bonding refers to the solid state joining of surfaces of similar or dissimilar metals by applying heat and pressure for a time duration long enough to cause co-mingling of the atoms at the joint interface. This is distinguished from fusion bonding or welding, which is the metallurgical joining or welding of surfaces of similar or dissimilar metals by applying enough heat to cause the materials at the joint interface to reach liquid or plastic state and thereby merge into an integral solid.

Figure 2:
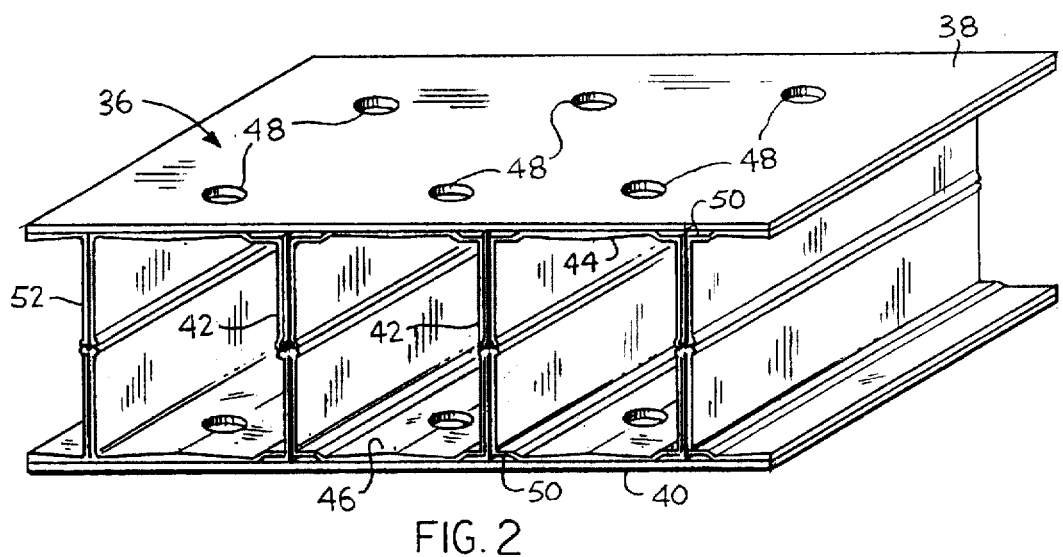
FIG. 2 is a perspective view of a four-sheet panel portion similar to those shown in FIG. 1 including reinforced webs of the present invention so that the compression of a bolted joint can be accommodated.

The panel structure 36 of FIG. 2 is constructed in accordance with the present invention and is shown with the sheets from which it is formed even though when the panel structure 36 is formed, all of the sheets are diffusion bonded together into an integral structure. The panel structure 36 includes parallel face sheets 38 and 40 with thick webs 42 made from core sheets 44 and 46 extending between the face sheets 38 and 40 in areas where fastener holes 48 are formed for fasteners used to form an edge joint. Doubler strips 50 are included with the thick webs 42 to reinforce them while normal thinner webs 52 do not include the doubler strips 50.

Figure 3:
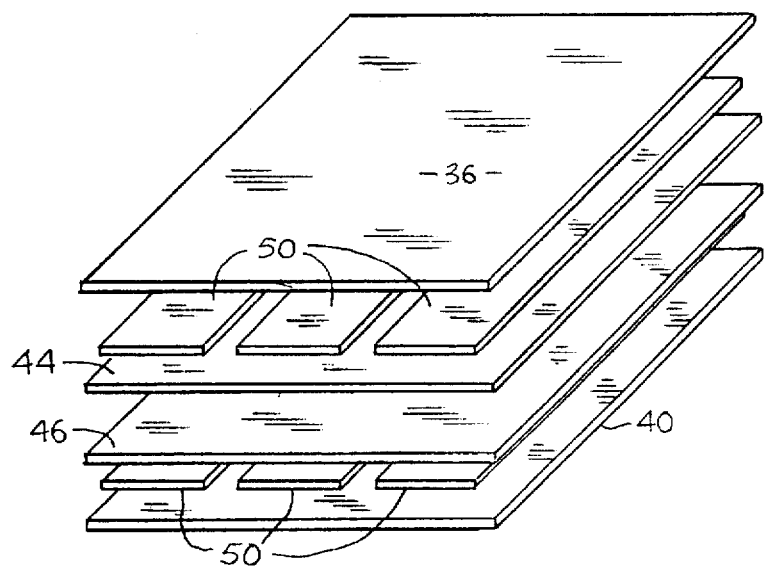
FIG. 3 is an exploded cross-sectional view of a four-sheet pre-assembly with doubler strips, used to form the panel of FIG. 2.
Figure 4:
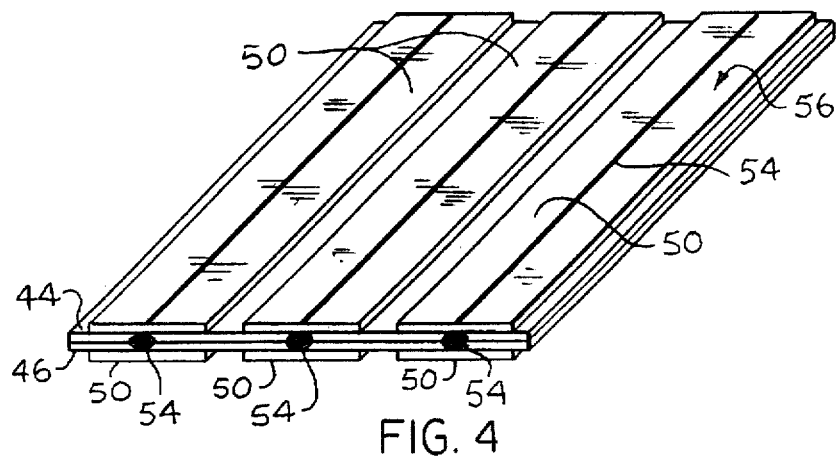
FIG. 4 is a cross-sectional view of the welded core sheet assembly with doubler strips of FIG. 3.
Figure 5:
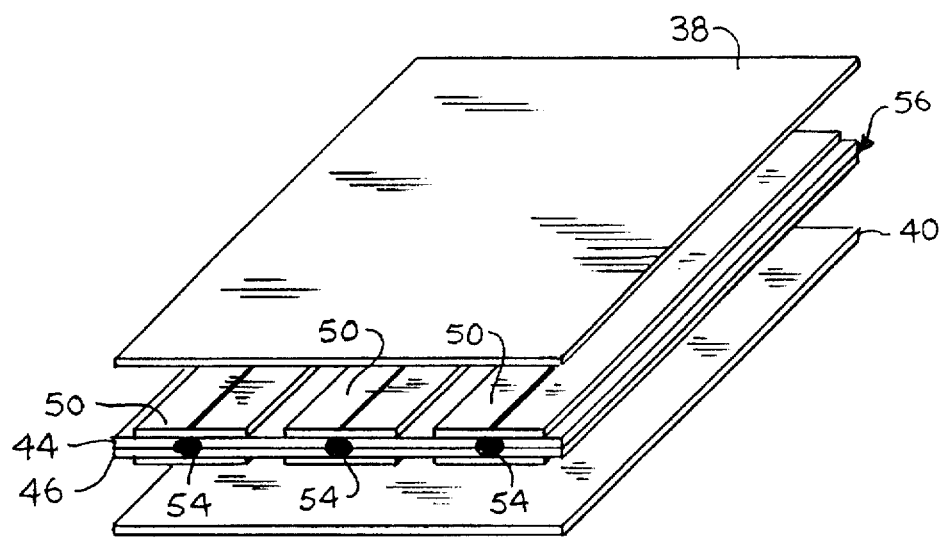
FIG. 5 is an exploded cross-sectional view of the welded core sheet assembly of FIG. 4 in position between two face sheets.
Figure 6:
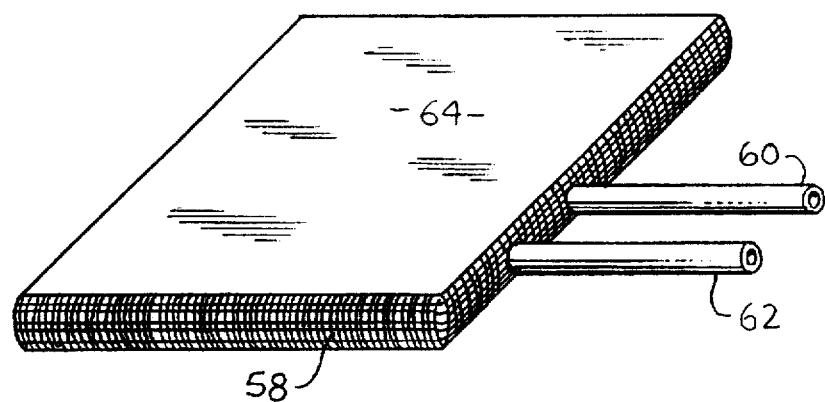
FIG. 6 is a perspective view of the assembly of FIG. 5 with its edges sealed by welding and with pressure tubes installed.
Figure 7:
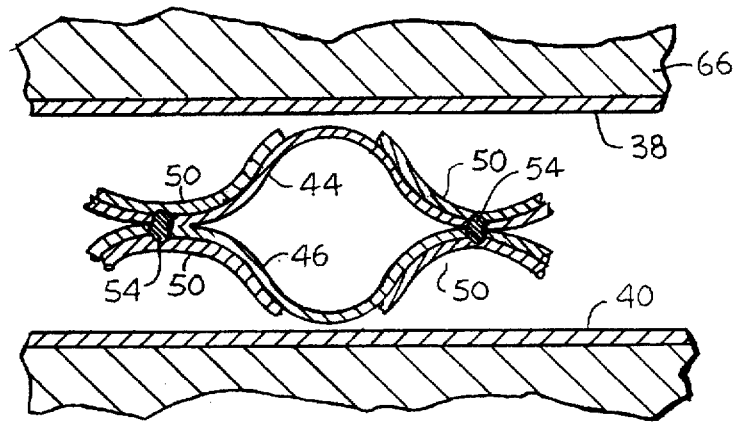
FIG. 7 is an enlarged cross-sectional view of a portion of the assembly of FIG. 6 as the panel is being formed.

To construct the panel structure 36, the face sheets 38 and 40, the core sheets 44 and 46 and the doubler strips 50 are assembled as shown in FIG. 3 with the core sheets 44 and 46 adjacent each other and doubler strips 50 outside the core sheets 44 and 46. As shown in FIG. 4, core sheets 44 and 46 and the doubler strips 50 are connected by linear welds 54 into a core assembly 56 formed by means such as a rollseam welder. The welds 54 may be intermittent to allow gas flow between the mating surfaces of the core sheets 44 and 46. The core assembly 56 is then positioned between the face sheets 38 and 40 (FIG. 5), and the edges 58 are welded (FIG. 6). A first tube 60 is manifolded to transmit inert gas between the face sheets 38 and 40 and the core assembly 56. A second tube 62 is connected through the edge 58 to transmit inert gas between the core sheets 44 and 46. The panel construction assembly 64 is then placed in a die 66 and heated to approximately 1650° F. Pressurized inert gas is introduced between the face sheets 38 and 40, and the core sheets 44 and 46. This causes the face sheets 38 and 40 to superplastically deform outwardly as shown in FIG. 7 into the shape of the die 66. During expansion of the face sheets, a slightly higher pressure is applied between the core sheets 44 and 46 through tube 62 so that the core sheets 44 and 46 move only a minimum amount and do not diffusion bond together.

Figure 8:
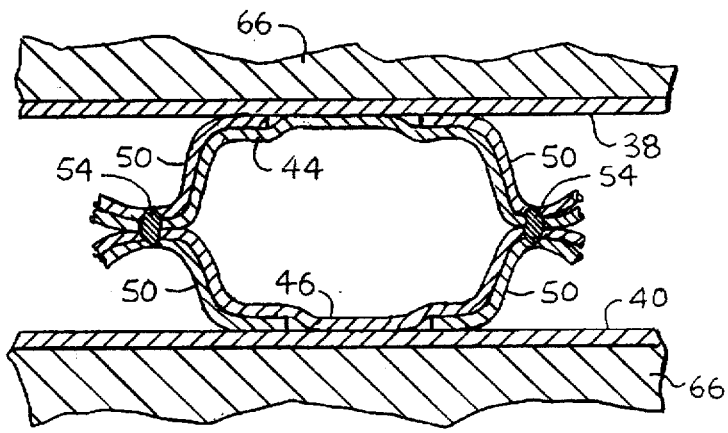
FIG. 8 is an enlarged cross-sectional view of the portion of the assembly of FIG. 6 as the panel is further along in its forming process than is shown in FIG. 7.
Figure 9:
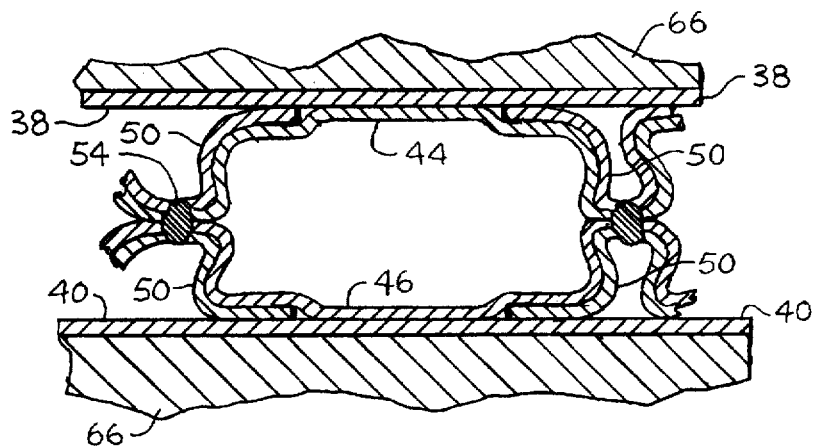
FIG. 9 is an enlarged cross-sectional view of the portion of the assembly of FIG. 6 as the panel is further along in its forming process than is shown in FIG. 8.

Once the face sheets 38 and 40 have reached their final positions against the die 66, the pressure of the inert gas between the face sheets 38 and 40 and the core sheets 44 and 46 is held at a value sufficient to maintain the face sheets 38 and 40 in position. Generally, about 50 psi is maintained with additional pressure being required when thick face sheets 38 and 40 are used. Thereafter sufficient pressurized inert gas is introduced between the core sheets 44 and 46 to cause them and the doubler strips 50 to balloon outwardly except where connected together by the welds 54. As shown in FIGS. 8 and 9, the core sheets 44 and 46 and the doubler strips 50 continue to balloon outwardly until first the core sheets 44 and 46 and then the doubler strips 50 contact and diffusion bond to the face sheets 38 and 40. Since the doubler strips 50 must contact the face sheets 38 and 40 and become bonded thereto before webs are substantially formed, the width of the doubler strips 50 need to be about the expected height of the web 42 being formed, since each doubler strip doubles over and assists in forming half of a web 42. This allows contact to be made with the face sheet 38 or 40 so that the doubler strips 50 deform and stretch with the core sheet 44 or 46 as a web 42 is being formed. The core sheets 44 and 46, and the doubler strips 50 continue to balloon until the doubler strips 50 fold over the welds 54 with the core sheets 44 and 46 following to form the relatively thick webs 42 and relatively thin webs 52 where doubler strips 50 are not present. It is possible to tailor the thickness of the webs 42 by varying the thickness of the doubler strips 50, thereby avoiding excessive weight. For example, if the panel 20 was made in accordance with the present invention, webs 42a would be the thickest, and the web 42b next to undoubled web 52a, thinner, but including a thin doubler strip 50.

Figure 10:
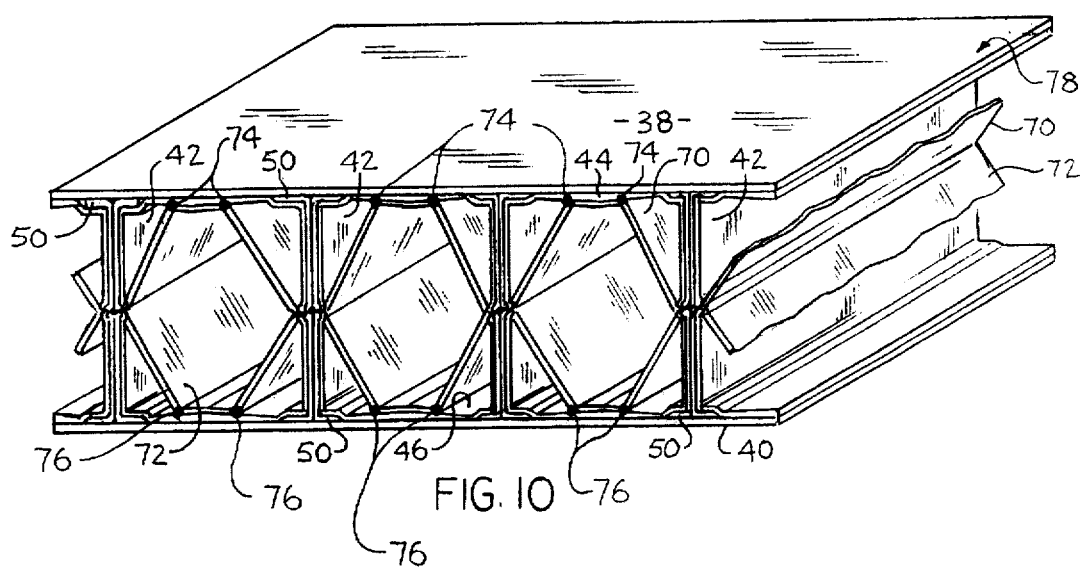
FIG. 10 is a perspective view of a panel similar to that of FIG. 2 modified with diagonal reinforcements.

As shown in FIG. 10, if inner core sheets 70 and 72 are added between core sheets 44 and 46 and are attached by welds 74 (between sheets 44 and 70) and welds 76 (between sheets 46 and 72) before the assembly is blown, diagonal reinforcements can be formed to further strengthen the resultant panel 78.

Figure 11:
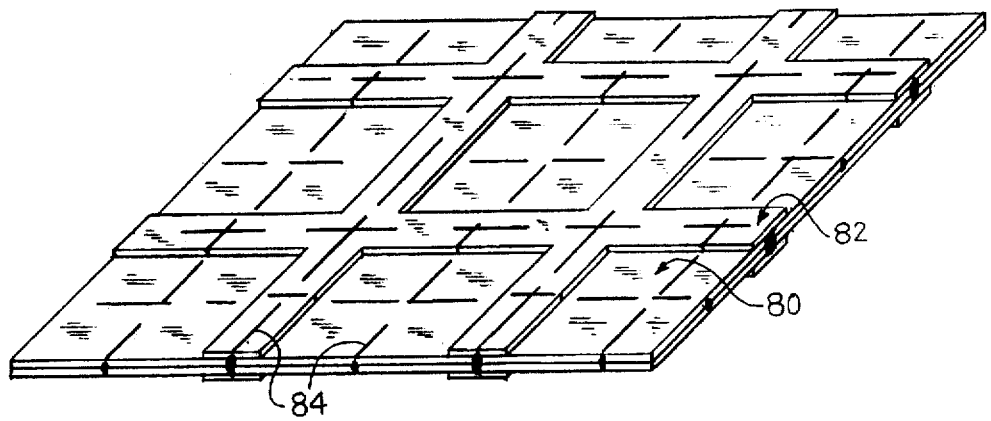
FIG. 11 is a perspective view of a core sheet assembly used to make a panel with rectangular cells and alternating thick and thin webs.
Figure 12:
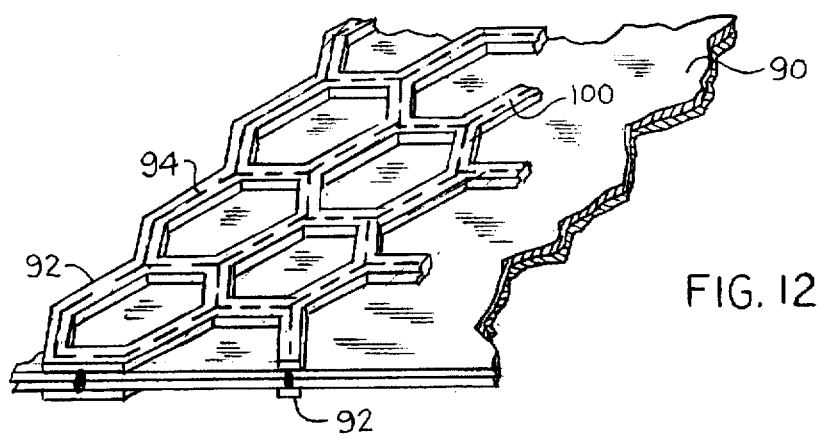
FIG. 12 is a perspective view of a core sheet assembly used to make a panel with honeycomb cells with thick webs.

Other internal configurations can be reinforced by doubler strips. For example, the core assembly 80 of FIG. 11 including the doubler grids 82 can be used to form rectangular cells with thickened webs. Note that intermittent welds 84 are positioned along the doubler grids 82 and across the grids 82 so that the cells can be formed and so the cell webs will alternate between thick and thin. A core assembly 90 having hexagonal grids 92 with intermittent welds 94 there along is shown in FIG. 12 so that a panel with honeycomb cells with thick webs can be formed. After forming, the breaks 100 in the welds 94 become gas passages during the forming operation that allow gas pressure to equalize across the resultant panel.

Figure 14:
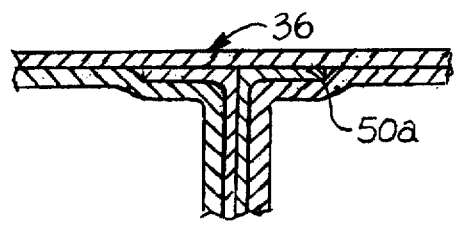
FIG. 14 is a detail cross-sectional view of a thick web portion having a relatively thin doubler.
Figure 13:
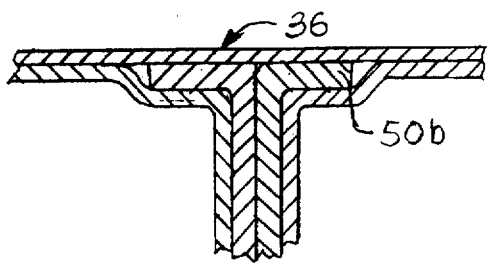
FIG. 13 is a detail cross-sectional view of a thick web portion having a thick doubler.
Figure 15:
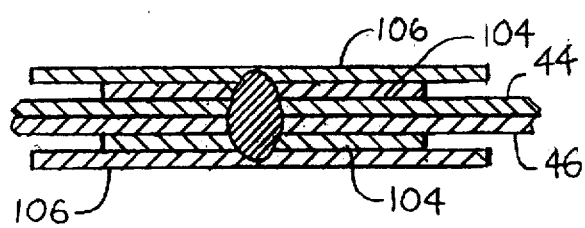
FIG. 15 is a cross-sectional view of a four doubler, two core sheet stack.
Figure 16:
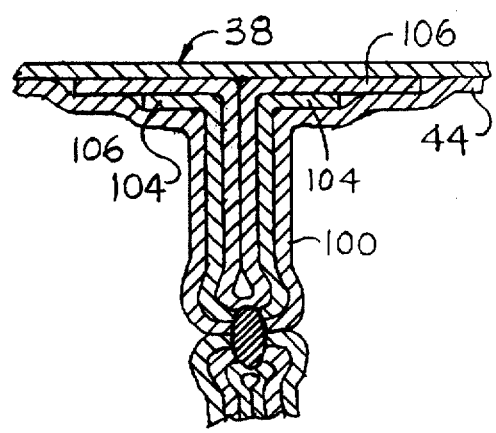
FIG. 16 is a cross-sectional view of a thick web portion resulting from the stack of FIG. 15.
Figure 17:
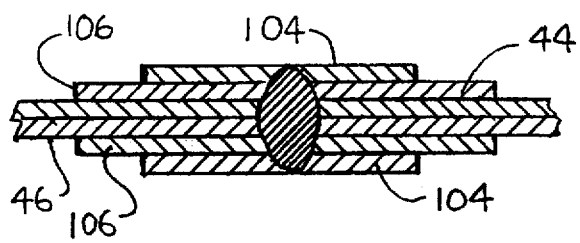
FIG. 17 is a cross-sectional view of a four doubler, two core sheet stack with the widths of the doublers reversed from the stack of FIG. 15.
Figure 18:
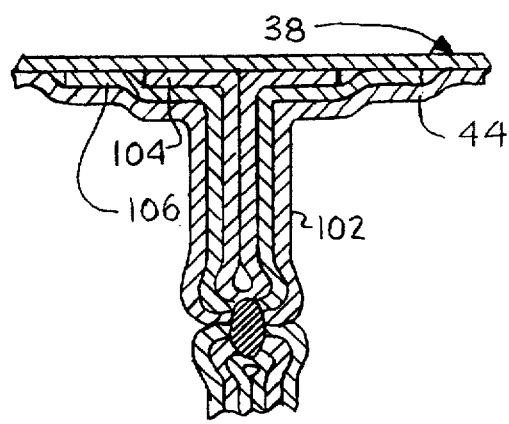
FIG. 18 is a cross-sectional view of a thick web portion resulting from the stack of FIG. 17.

As shown in FIG. 13 and 14, the doubler strips 50a and 50b may have varying thickness. This is useful in applications where different amount of compressive stress is applied to different areas of the panel structure 36 and where unneeded weight can not be tolerated. As shown in FIGS. 15 through 18, thicker webs 100 and 102 may be constructed by including two doubler strips 104 and 106 having different widths. The web 100 is constructed by stacking the narrower doubler strips 104 adjacent the core sheets 44 and 46, while web 102 is constructed by stacking the wider doubler strips 106 adjacent the core sheets 44 and 46.

Thus, there has been shown and described novel SPF/DB structures with selectively thicker webs for areas of high compressive stress and the processes by which they are made which fulfill all of the objects and advantages sought therefor. Many changes, alterations, modifications and other uses and applications of the subject invention will become apparent to those skilled in the art after considering the specification together with the accompanying drawing. All such changes, alterations and modifications which do not depart from the spirit and scope of the invention are deemed to be covered by the invention which is limited only by the claims that follow.

We claim:

1. An SPF/DB structural panel comprising:

a first face sheet;

a second face sheet separated from said first face sheet;

at least one first separator web positioned generally perpendicular to said first and second face sheets and connected to said face sheets to maintain the separation thereof, each said first separator web having:

first and second sides;

a first average distance between said first and second sides; and a centerline bulge there along generally centered between said first and second face sheets and extending from said first and second sides; and at least one second separator web positioned generally perpendicular to said first and second face sheets and connected to said face sheets to maintain the separation thereof, each said second separator web having:

first and second sides;

a second average distance between said first and second sides larger than said first average distance; and a centerline bulge there along generally centered between the first and second face sheets and extending from said first and second sides, wherein said panel has at least one edge, said at least one second separator web being positioned closer to said edge than said at least one first separator web.

2. The SPF/DB structural panel as defined in claim 1 wherein said panel has:

a butt joint edge;

a plurality of second separator webs positioned along said butt joint edge;

a plurality of first separator webs positioned spaced from said butt joint edge;

a first doubler plate positioned adjacent said first face sheet opposite said second separator webs;

a second doubler plate positioned adjacent said second face sheet opposite said second separator webs;

aligned holes through said doubler plates and said face sheets; and a plurality of fasteners extending through said aligned holes to retain said doubler plates to said face sheets.

3. The SPF/DB structural panel as defined in claim 1 wherein said panel further includes:

at least one third separator web positioned generally perpendicular to said first and second face sheets and connected to said face sheets to maintain the separation thereof, each said second separator web having:

first and second sides;

a third average distance between said first and second sides larger than said first average distance and smaller than said second average distance; and a centerline bulge there along generally centered between said first and second face sheets and extending from said first and second sides.

4. The SPF/DB structural panel as defined in claim 3 wherein said panel has:

a butt joint edge;

a plurality of second separator webs positioned along said butt joint edge;

a plurality of first separator webs positioned spaced from said butt joint edge;

at least one third separator webs positioned between said first and second separator webs;

a first doubler plate positioned adjacent said first face sheet opposite said second separator webs;

a second doubler plate positioned adjacent said second face sheet opposite said second separator webs;

aligned holes through said doubler plates and said face sheets; and a plurality of fasteners extending through said aligned holes to retain said doubler plates to said face sheets and apply compressive stress to said second separator webs.

5. An SPF/DB structural panel comprising:

a first face sheet;

a second face sheet separated from said first face sheet;

at least one first separator web positioned generally perpendicular to said first and second face sheets and connected to said face sheets to maintain the separation thereof, each said first separator web having:

first and second sides;

a first average distance between said first and second sides; and a centerline bulge there along generally centered between said first and second face sheets and extending from said first and second sides; and at least one second separator web positioned generally perpendicular to said first and second face sheets and connected to said face sheets to maintain the separation thereof, each said second separator web having:

first and second sides;

a second average distance between said first and second sides larger than said first average distance; and a centerline bulge there along generally centered between the first and second face sheets and extending from said first and second sides.

wherein said panel further includes:

a first diagonal web extending between said first side of said centerline bulges and said first face sheet;

a second diagonal web extending between said first side of said centerline bulges and said second face sheet;

a third diagonal web extending between said second side of said centerline bulges and said first face sheet; and a fourth diagonal web extending between said second side of said centerline bulges and said second face sheet.

6. The SPF/DB structural panel as defined in claim 5 wherein said first and fourth diagonal webs are parallel to each other, and said second and third diagonal webs are parallel to each other.

7. An SPF/DB structural panel comprising:

a first face sheet;

a second face sheet separated from said first face sheet;

at least one first separator web positioned generally perpendicular to said first and second face sheets and connected to said face sheets to maintain the separation thereof, each said first separator web having:

first and second sides;

a first average distance between said first and second sides; and a centerline bulge there along generally centered between said first and second face sheets and extending from said first and second sides;

at least one second separator web positioned generally perpendicular to said first and second face sheets and connected to said face sheets to maintain the separation thereof, each said second separator web having:

first and second sides;

a second average distance between said first and second sides larger than said first average distance; and a centerline bulge there along generally centered between the first and second face sheets and extending from said first and second side;

at least one third separator web having;

first and second sides;

a third average distance between said first and second sides; and a centerline bulge there along generally centered between said first and second face sheets and extending from said first and second sides; and at least one fourth separator web having;

first and second sides;

a fourth average distance between said first and second sides; and a centerline bulge there along generally centered between said first and second face sheets and extending from said first and second sides, said first and third separator webs being perpendicular to each other and said second and fourth separator webs being perpendicular to each other.

8. An SPF/DB structural panel comprising:

a first face sheet;

a second face sheet separated from said first face sheet;

at least one first separator web positioned generally perpendicular to said first and second face sheets and connected to said face sheets to maintain the separation thereof, each said first separator web having:

first and second sides;

a first average distance between said first and second sides; and a centerline bulge there along generally centered between said first and second face sheets and extending from said first and second sides;

at least one second separator web positioned generally perpendicular to said first and second face sheets and connected to said face sheets to maintain the separation thereof, each said second separator web having:
first and second sides;
a second average distance between said first and second sides larger than said first average distance; and
a centerline bulge there along generally centered between the first and second face sheets and extending from said first and second sides;

at least one third separator web having:
first and second sides;

a third average distance between said first and second sides; and a centerline bulge there along generally centered between said first and second face sheets and extending from said first and second sides, said third average distance being between said first and second average distances.

* * * * *